United States Patent [19]

Stanley et al.

[11] Patent Number: 5,023,132

[45] Date of Patent: Jun. 11, 1991

[54] PRESS FELT FOR USE IN PAPERMAKING MACHINE

[75] Inventors: William J. Stanley, Greenville; William P. Irwin, Jr., Spartanburg, both of S.C.

[73] Assignee: Mount Vernon Mills, Inc., Greenville, S.C.

[21] Appl. No.: 504,320

[22] Filed: Apr. 3, 1990

[51] Int. Cl.⁵ .............................................. B32B 5/02
[52] U.S. Cl. .................................. 428/234; 428/225; 428/229; 428/257; 428/258; 428/280; 428/282; 428/284; 428/297; 428/298; 428/300
[58] Field of Search .............. 428/225, 227, 229, 234, 428/297, 298, 284, 287, 257, 258, 300, 280, 282

[56] References Cited

U.S. PATENT DOCUMENTS

| 4,414,263 | 11/1983 | Miller et al. | 428/234 |
| 4,565,735 | 1/1986 | Murka et al. | 428/234 |
| 4,676,278 | 6/1987 | Dutt | 428/229 |
| 4,695,498 | 9/1987 | Sarrazin et al. | 428/225 |

Primary Examiner—James J. Bell
Attorney, Agent, or Firm—Dority & Manning

[57] ABSTRACT

A press felt for use in a papermaking machine. The press felt includes a base fabric having a batt of fibers secured to at least an upper surface of the base fabric, and preferably to both sides of the base fabric. The base fabric has a plurality of noncircular synthetic monofilament warp or machine direction ends and a plurality of shute or machine direction ends interwoven therewith according to a predetermined weave pattern.

18 Claims, 1 Drawing Sheet

PRESS FELT FOR USE IN PAPERMAKING MACHINE

This invention relates to felts for use on paper-making machines and more particularly relates to press felts for use in the press section of a papermaking machine.

BACKGROUND OF THE INVENTION

A conventional papermaking machine is divided into three primary sections, namely a forming section, a press section, and a drying section. In the forming section, a porous forming fabric is employed which is designed to receive an aqueous dispersion of fibers where a major portion of the water is removed through the forming fabric, leaving the fibers in sheet form, though at that stage without any real coherence between the fibers. In other words, initial formation of the paper sheet occurs in the forming section. Following initial formation of the sheet, the sheet is transferred to the press section where it is delivered onto a press felt, and while in contact with the felt moves through one or more press rolls or pressure nips for removal of most of the remaining water from the sheet. From the press section, the sheet then moves to the dryer section where the now low moisture paper sheet or web encounters a series of heated dryer cylinders with dryer fabrics therearound to further remove moisture from the web and dry the paper.

In each of the forming section, press section and drying section, a fabric or felt of some sort is employed to both support the sheet being formed and to facilitate removal of water therefrom. The present invention is directed to felts for use in the press section of the papermaking machine.

In the press section of the papermaking machine, the fabric or felt that is employed encircles a plurality of guide rolls in an endless loop with one or more pressure nips, vacuum boxes, spray units or the like located around the loop, to facilitate further formation of the paper web by the removal of water therefrom and subsequent removal of water from the felt. In the press section of the papermaking machine, the fabric which is generally referred to as a press felt or wet felt originally was an all wool felt. In fairly recent history, however, due to cost, and technology advances, wool felts have been replaced with composite felts where base fabrics were produced and fiber batts were secured to one or both sides of the base fabric to achieve the intended technical purposes of the press section of the papermaking machine. Furthermore, increased machine speeds, the demands for higher quality paper, the demands for specialty papers and the like place more stringent requirements on the press felts. Hence, if proper attention is not given to the physical characteristics of such felts, poor quality paper can be produced, felt life can end prematurely, production expenses can escalate and the like, all of which can lead to disastrous results. Particularly, in the press section of the machine, as will be explained in more detail hereinafter, the press or wet felts are continuously compressed and relieved from load at high frequencies thus necessitating proper elongation, stretch, compression, and release properties as well as overall stability and runability.

In attempting to arrive at improved press felts, various and sundry techniques have been employed, in the selection of the particular yarns or yarn groups that are utilized in the weaving of the base fabric, the weave designs per se, the batt structures, techniques for securing the batts to the base fabric, and the like. Many different weave patterns have been employed in the production of both single layer and multilayer fabrics utilizing natural and synthetic yarns and blends. Synthetic yarns such as polyesters, polyamides, polypropylenes and the like, have been employed in monofilament, multifilament, spun yarn and piled monofilament form for both warp and shute ends. Moreover, while historically non-round synthetic monofilaments have been used in forming fabrics and dryer fabrics for use on papermaking machines, insofar as the press felts are concerned, non-round synthetic monofilaments have been only sparingly utilized, and then only in the shute or cross-machine direction. There is no knowledge of any use of non-round monofilaments in the warp or machine direction for press felts. Furthermore, the use of non-round synthetic monofilaments as a warp end in a press felt is not obvious due, in part, to the fact that needling of fiber batts to base press fabrics would be expected to excessively break needles during the needling process and/or split the generally flat monofilaments, both of which could be highly detrimental to the papermaking process.

There is thus no known prior art that is believed to anticipate or suggest the present invention.

SUMMARY OF THE INVENTION

It is an object of the present invention to provide an improved base fabric for use in the formation of a press felt for a papermaking machine.

Another object of the present invention is to provide an improved press felt for use in a papermaking machine.

Yet another object of the present invention is to provide a press felt for a papermaking machine where the base fabric of same is flat woven and an improved pin seam is produced.

Still further another object of the present invention is to provide a wet felt for the press section of a papermaking machine that will withstand the compressive and release rigors of the press section while remaining durable and dimensionally stable.

Yet another object of the present invention is to provide an improved press felt for use in a papermaking machine which effectively handles water extracted from the paper sheet and does not mark the sheet.

Generally speaking, the present invention relates to a press felt for a papermaking machine comprising a base fabric, said base fabric having a top surface and a bottom surface, and including a plurality of warp or machine direction ends with a plurality of shute or cross machine direction ends interwoven therewith according to a predetermined weave pattern, said warp ends being non-round synthetic monofilaments, said monofilaments having a depth dimension in a range of from about 0.010 inch to about 0.025 inch and a width dimension of from about 0.020 inch to about 0.035 inch so that improved pressure distribution across the fabric and lessening of sheet marking are realized.

In a more preferred configuration, press felts according to the present invention include a base fabric as described above with one or more layers of batt fibers secured to at least a top surface of same. Generally, in fact, at least one layer of batt fibers is secured to both the top and bottom surfaces of the base fabric.

More specifically, in a preferred construction, the base fabric has non-round synthetic monofilament ends in the machine direction, preferably of nylon or polyester with round synthetic monofilament ends in the cross machine direction and is woven into a duplex fabric. A synthetic fiber batt is secured to the base duplex fabric, preferably by needling, to form a smooth upper support surface for a paper web or sheet being brought into contact therewith, while at the same time maintaining good compression and release, stability and water drainage characteristics.

The non-round synthetic monofilaments referred to herein can take various shapes, though whatever shape is used, it is preferred that a generally flat or planar surface be provided adjacent the upper surface of the fabric to best achieve the improvements expressed for the present invention. Hence, the shaped monofilaments could be rectangular, triangular, multilobal, and the like. The monofilaments are routinely produced according to a melt spinning or other process where the filament is formed by extruding a generally fluid composition through a generally like shaped orifice followed by solidification of the composition. There is a tendency for the composition to smooth out prior to solidifcation into the shaped monofilament whereby all corners are generally rounded. A rectangular shaped monofilament could thus also, in reality, be referred to as an oval cross-section. Use of the terms rectangular, triangular, and the like are intended to also include shapes which have such appearance though not necessarily correct in a true geometrical sense.

With a generally flat upper surface of machine direction ends with respect to the upper surface of the base fabric, and round monofilaments or yarn bundles stacked in the cross machine direction as in the preferred duplex fabric, crimps produced in the base fabric are primarily in the machine direction only as opposed to the cross machine direction. Moreover, due to the generally flat upper surfaces of the non-round machine direction monofilaments, knuckles in the upper surface of the base fabric which could be translated to knuckles in the upper surface of a batt needled thereto are minimized, if not avoided. Moreover, since the base fabric according to the present invention is flat woven and requires a seam, the non-round monofilaments in the machine direction may also be conveniently looped to create the basis for an improved pin seam for the press felts.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF PREFERRED EMBODIMENT

Making specific reference to the figures, preferred embodiments of the present invention will now be described in detail.

Figure 2:
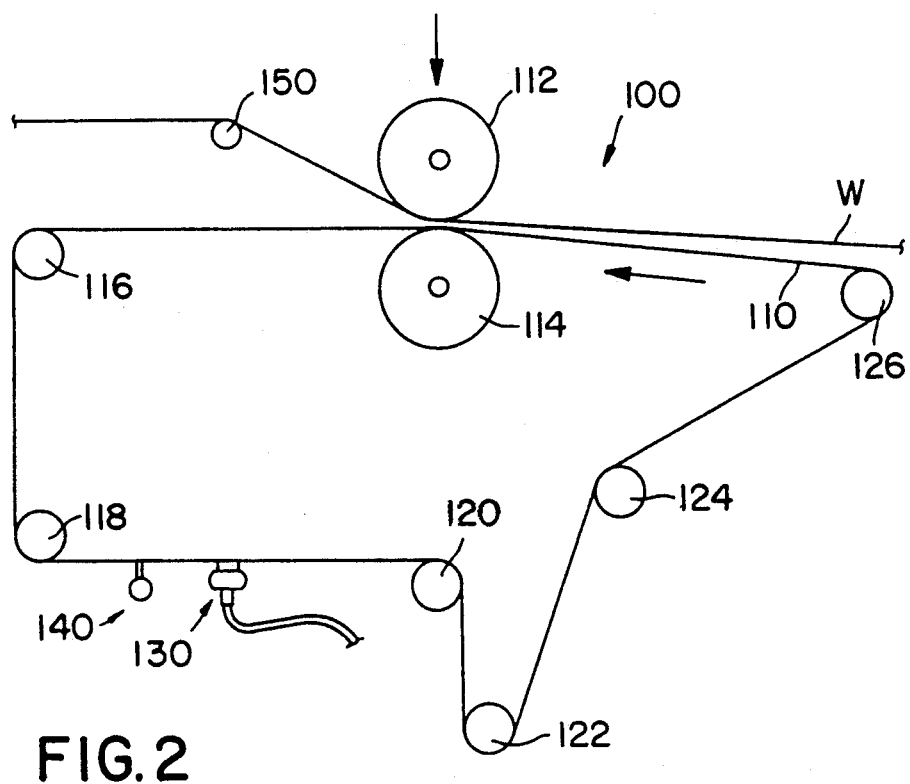
FIG. 2 is a side elevational schematic view of one typical press section arrangement on a papermaking machine.

Viewing the schematic of the press section of a papermaking machine as illustrated in FIG. 2, the forming section of the machine would appear to the right or upstream of the press section with the dryer section to the left or downstream of the press section. Since the felts according to the present invention are specific to the press section of the papermaking machine, neither the forming section nor the dryer section of the machine is illustrated, however, both would be well known to those skilled in the art.

Suffice it to say that the paper sheet or web is initially formed in the forming section and is finally dried in the dryer section from which the sheet is cut to length, taken up in roll form or the like. The press section of the machine thus is located in between the forming and dryer sections, and is intended to extract further water from the sheet without damage to the sheet as by marking, preparatory to drying. While a single press section is illustrated, a number of different sections may be present in tandem, with the moisture removal or handling requirements differing from section to section.

As illustrated in the press section of FIG. 2, a web or sheet W enters the section from the forming section and is brought into engagement with the press felt 110. While in engagement with the press felt 110, web W is subjected to one or more pressure nips such as might be produced by nip rolls 112, 114, or the like (only one shown). After the intended water extraction from web W is accomplished, web W is moved out of engagement with press felt 110, around an appropriate guide roll 150 and onto the dryer section of the papermaking machine. While FIG. 2 is simplistic and schematic in nature, it is intended, as noted above, as representative of one or more press sections that might be provided on a papermaking machine. Once the paper web W is lifted off press felt 110, the press felt will then continue around guide rolls 116, 118, 120, 122, 124 and 126 as depicted, following an endless path to return a portion felt 110 to a new, wet segment of oncoming paper web W.

While, as illustrated in FIG. 2, there may be short contact between web W and felt 110, the physical characteristics of the felt are highly important. For example, nip pressures between nip rolls 112 and 114 can range from about 200 to about 2000 pounds per linear inch, with web W and felt 110 located therebetween. Such pressures are intended to squeeze water from web W, and the extracted water must leave web W; otherwise the exercise is futile. Felt 110 must therefore have the capability of taking up virtually all of the water expressed from web W. Since most of the materials of construction of felt 110 have only small or virtually no absorptive capacity for water per se, it is important that the overall construction of the felt provide proper voids or passageways to permit water from web W to move away from the web. Likewise, since web W is in a generally wet condition upon entering the press section, when subjected to the nip pressures noted above, it is important that any surface irregularities present on felt 110 not emboss or otherwise mark web W.

In the press section of the papermaking machine therefore, depending upon the particular paper being produced, and/or the position of one section if more than one is involved, varying felt properties are important. For example, and as noted above, in the press section of the papermaking machine, it is intended that a large portion of the residual moisture be extracted from the web prior to the dryer section so as to reduce the load on the dryer section, while at the same avoiding the production of undesirable marking on the paper. Also, as with other industries, higher production speeds, higher quality product, and more sophisticated products from a standpoint of overall paper quality, thickness and surface characteristics are constantly being sought. Consequently, there is an ever pressing need to improve press felts, engineered to the paper being produced and the particular press section in which the felt is to be employed. However, it is always important that press felt be formed properly, have good strength, runability, and stability, have a uniformly absorptive surface and have good smoothness of the upper or paper contact surface, while also having proper elongation, stretch resistance and compression resistance due to factors mentioned herein-above.

Referring back to FIG. 2, it is thus important that upon contact between the paper web and the press felt, that the felt be capable of undergoing pressure nips for the removal of water from the web, and that the felt displace the extracted water away from the web. Thereafter, and very importantly during a portion of its closed path, the water received from web W must be removed from felt 110 by vacuum extraction or the like and felt 110 should be cleaned. In other words, felt 110 must be capable of continuous rejuvenation for subsequent water removal from a new segment of the continuously moving web. Without such rejuvenation, and the presentation of felt 110 in proper form and conditioning to web W, proper water removal from web W will not be continuously achieved.

Figure 1:
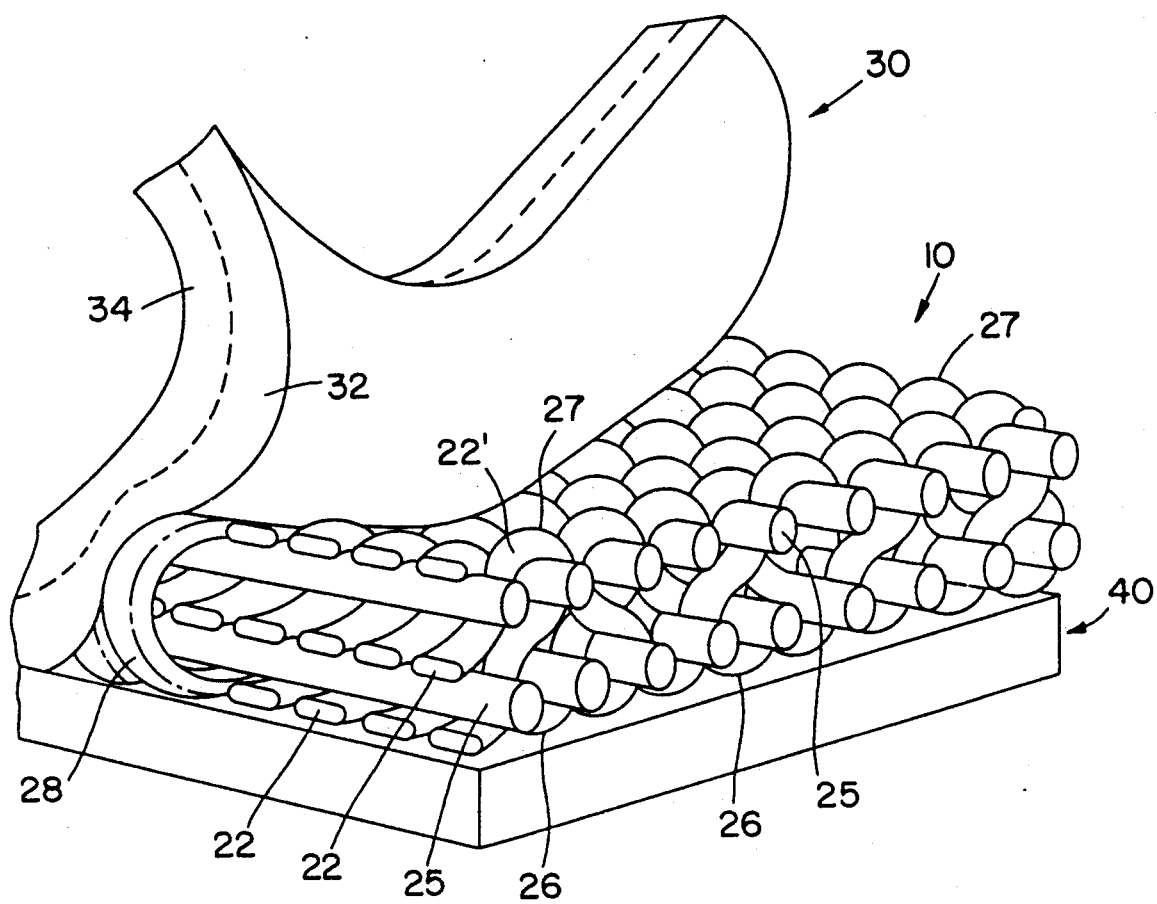
FIG. 1 is a schematic view of a typical duplex base fabric according to the present invention having a fiber batt structure secured to opposite sides of same and with a portion of the upper surface batt being peeled back for clarity.

In order to attempt to accommodate the above needs, press felts historically have included either a woven fabric of a predetermined design, or a woven fabric as a base structure or fabric to which fiber batts were secured to one or both sides of same such as by needling, lamination or the like. Such a fabric is illustrated in FIG. 1 generally as 10, with a fiber batt generally 30 secured to a top surface of same and a fiber batt generally 40 secured to a bottom surface of same. For a sense of understanding, the top side or surface of base fabric 10 (at fiber batt 30) is the paper contact side of the felt, whereas the bottom side which includes fiber batt 40 is the bottom side or surface of the felt which moves around the inside of the endless loop of the press section as shown in FIG. 2. Base fabric 10 as shown in FIG. 1, is a three by one duplex fabric with a plurality of warp or machine direction ends 22 and shute or cross machine direction ends 25 interwoven therewith. As illustrated, the warp or machine direction yarns 22 are generally flat or rectangularly shaped monofilaments whereas the shute yarns 25 are round monofilaments.

In the sense of the present invention, shaped warp ends 22 preferably are generally rectangular as shown, though from a practical standpoint as noted above, a true rectangle is normally not achieved but the shape is more like an oval. Shaped monofilament warp ends 22 are may be polyamides such as nylons, or polyesters such as polyethylene terephthalates, polybutylene terephthalatesor any other monofilament that can be extruded in a shaped form so long as it meets other requirements of a press felt according to the present invention. Use of shaped monofilaments 22 in the warp, enables one to utilize higher yarn counts in the machine direction which affords greater stability to the fabric and as can be seen from FIG. 1, enables the production of smaller knuckles 27, 26 about the top and bottom surfaces of base fabric 10 than would be present if a round monofilament were substituted therefor. Knuckle formation of course is important from a standpoint of paper marking and can be transmitted through the fiber batt under the high nip pressures that are encountered in the press section of the papermaking machine. Also, while rectangular shaped monofilaments 22 are generally depicted in FIG. 1, other shapes could be employed so long as the requisite attributes of a press fabric are achieved in utilization of same, for example, triangular, multilobal and the like. In a most preferred situation, however, the upper surface 22' of the monofilament (see FIG. 1) preferably is flat or planar so as to lower knuckles 27 produced thereabove during weaving.

Shute ends 25, as mentioned above, are depicted in FIG. 1 as round monofilaments. Other types of yarns may be employed depending upon the required characteristics of the press felt such as spun yarns, plied spun yarns, multifilament yarns, plied monofilament yarns, cabled monofilament yarns and the like. In general, the sheet ends should be slightly lighter in weight than the warp ends. As with warp monofilaments 22, shute ends, whether monofilament or otherwise may be polyamides, polyesters, or the like so long as the requisite characteristics for the particular felt are met.

Insofar as base fabric 10 is concerned, for proper dewatering characteristics, there should be an adequate void volume within the fabric to remove the expressed water from a web W. In this regard, at high speeds and loads, it is important that water be able to penetrate the fabric surface (the fiber batt normally) and migrate through the internal volume of the felt to the underside of same.

Fiber batts 30 and 40 as shown in FIG. 1, and which are typical for press felts, may be the same or of different construction for the top and bottom surfaces of the press felts. For example, in certain press sections, as mentioned above, it is desirable that the surface of the press felt making contact with the paper web be rougher to facilitate release of the web, whereas in other sections it is highly desirable that the contact surface the very smooth to avoid any marking of web W. Generally speaking, fiber batts utilized on press section felts today are synthetic fibers which have been produced into a generally coherent structure to afford a particular surface smoothness and/or porosity and which are capable of being united to a base fabric, normally by needling, but likewise can be adhesively or otherwise laminated thereto. Fiber batts according to the present invention are preferably produced from staple length synthetic fibers, such as polyesters or polyamides with individual fiber deniers ranging from about 3 to about 60 and with a weight basis of the fiber batt ranging from about 1.5 ounces per square foot to about 3.5 ounces per square foot. Blends of fibers may also be used to achieve certain characteristics such as wad burn and/or heat resistance.

As illustrated in FIG. 1, and as is most preferred according to the present invention, a single batt layer 40 is utilized on the underside of base fabric 10, while plural batt layers 32, 34 are presented on the upper or contact surface of base fabric 10 for web contact. In instances where plural batt layers are utilized, it is typical that separate needling operations be employed to needle the first or inner batt layer or layers 32 to the base fabric and thereafter the top or outer batt layer or layers 34 to the lower batt layer 32. Consequently, in order to produce a press felt, it frequently, and normally, is necessary to pass the base fabric through a needling head more than once for securement of the batt fibers to a single fabric surface, and for attainment of desired surface characteristics for the batt.

Base fabrics according to the present invention may be woven in any desired weave pattern that is desired or necessary for the particular intended use of the felt. For example, the base fabric may be a single or multiple layer fabric and may be a twill, modified twill, a sateen, a duplex, a triplex, or the like, or a combination of same where one weave pattern is presented on one surface of the fabric and another weave pattern is presented on the opposite surface of the fabric. End counts per inch in accordance with the present invention may range from about 36 to about 64 in the warp direction and from 24 to about 34 in the shute direction. The shaped monofilament warp ends may range in depth from about 0.010 inch to about 0.025 inch and in width from about 0.020 inch to about 0.035 inch, and preferably there is a width to depth ratio of up to 2.0 to 1. Shute ends, if monofilament may range from about 0.012 to about 0.030 inch in diameter and shute yarn bundles may be provided in the same general diameter range as for monofilaments.

A most preferred press fabric according to the present invention is a wet felt having a multilayer base fabric which depending upon the press section in which the fabric is utilized, may or may not have a fiber batt secured thereto. The preferred weave pattern is a three and one duplex as illustrated in FIG. 1 in which the warp or machine direction ends are 0.014 inch $\times$ 0.021 inch nylon (54 ends per inch) while the shute or cross machine direction ends are 0.018 inch diameter round nylon (28 ends per inch), and with the fabric flat woven. Flat wrap ends 22 are manipulated during weaving to form loops 28 at ends of the fabric for the generation of a pin seam thereat. The technique for weaving the loop into the fabric is known to those skilled in the art, and will not be discussed in detail.

To a base fabric just described, a fiber batt of 40 denier nylon was needled to a bottom surface of the fabric which is the lower side as illustrated in FIG. 1 with the particular fiber batt indicated generally by the numeral 40. At the upper surface of base fabric 10, two layers of 40 denier nylon batt fiber were needled to the fabric after which two layers of 15 denier nylon were needled on top of the 40 denier nylon batts to afford a proper upper support surface for the press felt. Total fiber batt weight was about 2.5 ounces per square foot, and needling was accomplished with ball point needles to ensure proper entanglement of the batt fibers into base fabric 10 while avoiding undue splitting of the flat warp ends 22.

Utilizing the techniques as described above for the most preferred fabric according to the present invention, felts produced have varied from about 4.0 to about 6.0 ounces per square foot of felt with an air permeability ranging from about 30 to about 160 cubic feet per minute and with a caliper ranging from about 0.110 inch to about 0.210 inch.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A papermaking felt for use in the press section of the papermaking machine comprising a base fabric, said fabric having a top surface and a bottom surface and including a plurality of warp ends and a plurality of shute ends interwoven with said warp ends according to a predetermined weave pattern, said warp ends being noncircular synthetic monofilaments with a generally planar surface presented at the top surface of the fabric in locations where said warp ends are exposed at said top surface, said monofilaments having a depth dimension of from about 0.010 inch to about 0.025 inch and a width dimension of from about 0.020 inch to about 0.035 inch; and at least one fiber batt secured to at least the top surface of said base fabric, said fibers in said at least one batt being synthetic fibers and having a denier in a range of from about 3 to about 60.

2. A press felt as defined in claim 1 wherein said shute ends are round monofilaments.

3. A press felt as defined in claim 2 wherein said warp and shute monofilaments are polyamide monofilaments.

4. A press felt as defined in claim 2 wherein said warp and shute monofilaments are nylon.

5. A press felt as defined in claim 2 wherein said round monofilaments have a diameter in a range of from 0.012 inch to about 0.030 inch.

6. A press felt as defined in claim 1 wherein further at least one fiber batt is secured to said bottom surface of said base fabric.

7. A press felt as defined in claim 6 wherein said fiber batts are needled to said base fabric.

8. A press felt as defined in claim 1 wherein said fiber batt is composed of nylon staple fibers in a weight basis of about 2.5 ounces per square foot.

9. A press felt for use in a papermaking machine comprising a base fabric, said fabric having a top surface and a bottom surface and including a plurality of warp ends and a plurality of shute ends interwoven with said warp ends according to a predetermined weave pattern, said warp ends being noncircular shaped synthetic monofilaments and said shute ends being round synthetic monofilaments, said warp monofilaments having a depth dimension of from about 0.010 inch to about 0.025 inch and a width dimension of from about 0.020 inch to about 0.035 inch; a batt of synthetic fibers secured to said top surface of said base fabric and a batt of synthetic fibers secured to a bottom surface of said base fabric, fibers in said batts having a denier of from about 3 to about 60.

10. A press felt as defined in claim 9 wherein said shute ends have a diameter in a range of from about 0.012 inch to about 0.030 inch.

11. A press felt as defined in claim 9 wherein said shute ends have a diameter of about 0.018 inch.

12. A press felt as defined in claim 9 wherein the weave pattern of the base fabric is a three by one duplex.

13. A press felt as defined in claim 9 wherein the fiber batt secured to the top surface of the base fabric includes at least one inner layer adjacent said fabric of a first denier fiber and at least one outer layer atop said inner layer of a fiber having a larger denier than the fibers of said inner layer.

14. A press felt as defined in claim 13 wherein two inner layers of batt composed of 40 denier nylon fibers are secured to said fabric and said at least one outer layer of batt is composed of 15 denier nylon fibers.

15. A press felt as defined in claim 14 wherein two outer layers of batt composed of 15 denier nylon fibers are secured to said base fabric.

16. A press felt as defined in claim 13 wherein the batt secured to said bottom surface of said fabric is composed of 40 denier nylon fibers.

17. A press felt for use in a papermaking machine comprising a base fabric, said base fabric having a top surface and a bottom surface and including a plurality of warp ends and a plurality of shute ends interwoven with said warp ends to define a duplex fabric, said warp ends being synthetic monofilaments of noncircular shape, said shute ends being round synthetic monofilaments, said fabric further being woven to produce loops from said warp ends at the terminal ends of same so that a pin seam can be produced thereat; a batt of synthetic fibers secured to said bottom surface of said fabric, said batt being composed of 40 denier nylon fibers; and a batt of fibers secured to said upper surface of said fabric, said batt including at least one inner layer of 40 denier nylon fibers secured to said fabric and at least one outer layer of 15 denier nylon fibers secured to said inner layer.

18. A press felt as defined in claim 17 wherein said warp end synthetic monofilaments are nylon and have a depth dimension of from about 0.010 inch to about 0.025 inch and a width dimension of from about 0.020 inch to about 0.035 inch and having a width to depth ratio of up to 2.0 to 1, and said shute ends have a diameter in a range of from about 0.012 inch to about 0.030 inch.

* * * * *